United States Patent

Chambers, Jr.

[15] 3,639,696

[45] Feb. 1, 1972

[54] MULTISTATE VOLTAGE BOOSTER CIRCUIT FOR TELEPHONE SYSTEMS

[72] Inventor: Charles W. Chambers, Jr., Amherst, Ohio

[73] Assignee: Lorain Products Corporation

[22] Filed: Apr. 1, 1969

[21] Appl. No.: 811,992

[52] U.S. Cl. ............ 179/16 F

[51] Int. Cl. ............ H04b 3/00

[58] Field of Search ............ 179/16 F; 320/18, 25, 26; 307/48, 49, 61, 77

[56] References Cited

UNITED STATES PATENTS

| | | | |
|---|---|---|---|
| 3,527,894 | 9/1970 | Mesenhimer et al. | 179/16 F |
| 3,531,598 | 9/1970 | McNair, Jr. | 179/16 F |
| 2,055,647 | 9/1936 | Bowne | 179/16 F |
| 2,461,200 | 2/1949 | Dubuar | 179/16 F |
| 2,806,085 | 9/1957 | Schmidt | 179/16 F |
| 3,514,543 | 5/1970 | Rae | 179/16 F |

*Primary Examiner*—William C. Cooper
*Assistant Examiner*—Randall P. Myers
*Attorney*—John Howard Smith

[57] ABSTRACT

A circuit for increasing the flow of telephone line current in telephone systems which utilize reverse battery supervision and the grounding of the telephone line at the subscriber station for supervisory or control purposes. Power booster networks connected in series with respective sides of a telephone line each include a semiconductor switch for controlling the flow of current toward the subscriber station and a semiconductor switch for controlling the flow of current away from the subscriber station. A DC auxiliary source is connected in series with one switch in each power booster network. The conduction of the different switches is controlled in accordance with the voltages present in the telephone system to direct telephone line current flow through that one of the DC auxiliary sources which is in power aiding relationship to said current flow despite changes in the direction of current flow in one or both sides of the telephone line.

14 Claims, 3 Drawing Figures

INVENTOR.
CHARLES W. CHAMBERS, JR.

BY John Howard Smith

*INVENTOR.*
CHARLES W. CHAMBERS, JR.
BY John Howard Smith

MULTISTATE VOLTAGE BOOSTER CIRCUIT FOR TELEPHONE SYSTEMS

BACKGROUND OF THE INVENTION

The present invention relates to voltage booster circuits and is directed more particularly to a voltage booster circuit for telephone systems which utilize reverse battery supervision and which require the connection of ground potential to telephone lines at locations outside the central office.

An important consideration in the provision of telephone service is the maintenance of an adequate DC current flow in each subscriber circuit. This subscriber circuit current performs a variety of telephone system operations including the operation of a pulsing relay during dialing, the operation of a trip relay to terminate the ringing sound when the called party's receiver is lifted and the operation of a polar relay during dialing to identify the calling party from among the other parties of a party line. If this DC operating current is of insufficient magnitude, the above named relays and others will fail to operate and the telephone set will be useless.

The difficulty in supplying adequate DC operating current to each of a multiplicity of subscriber circuits is that each subscriber circuit has a DC resistance which varies, for a given diameter of wire, with the length of line which separates the subscriber set from the central office. For economic reasons it has been found advantageous to energize the majority of subscriber circuits from a central office battery of generally adequate terminal voltage, and to provide a plurality of voltage booster circuits to energize those relatively few subscriber circuits having resistances too high to operate directly from the central office battery. These voltage booster circuits are arranged to add a DC boost voltage in series, power aiding relationship between the central office battery and respective high-resistance subscriber circuits.

Because of the widespread use of reverse battery supervision, that is, the use of reversals in the polarity with which the central office battery is applied to a subscriber circuit for supervisory or control purposes, various control circuits have been developed which will coordinate the polarity of a serially added boost voltage with the polarity of the central office battery so as to insure a series-aiding relationship therebetween despite supervisory polarity reversals. While these early voltage booster circuits operated with some success with telephone lines which terminated at ordinary subscriber stations, prior to the present invention no voltage booster circuit had been developed which would operate satisfactorily with telephone lines which terminated at subscriber stations having a switch for connecting one or both sides of the telephone line to ground. Telephone systems which utilize such ground switches include these employing Strowger Automatic Toll Ticketing, ground start foreign exchange, prepay stations having coin collect and coin refund control capabilities or Tip Party Automatic Number Identification.

In subscriber circuits not provided with ground switches, current flows toward the subscriber station in one or the other of the subscriber line conductors and away from the subscriber station in the then remaining conductor to complete a closed circuit with the central office equipment. In telephone systems which utilize ground switches, however, in addition to the closed loop operating conditions described above, there occurs a subscriber circuit condition during which current flows away from the subscriber station in one or both subscriber line conductors. It is essential, therefore, that a voltage booster circuit for use in telephone systems requiring a ground switch at the subscriber station boost the subscriber line current, not only during normal operation when current flows in one or the other direction in the closed circuit of the subscriber loop, but also under special, grounded loop operating conditions when one or both subscriber line conductors carry current toward the central office.

SUMMARY OF THE INVENTION

Accordingly, it is an object of the invention to provide a voltage booster circuit for telephone systems utilizing reverse battery supervision.

It is another object of the invention to provide a voltage booster circuit for telephone systems which require the occasional application of ground potential to one or both sides of a telephone line at locations outside the central office.

Another object of the invention is to provide a plurality of voltage booster circuits, for disposition in series with respective sides of a subscriber line, which will maintain the connection of an auxiliary source in series-aiding, current conduction relationship between a central office battery and a subscriber circuit despite supervisory polarity reversals and despite the operation of ground switches at either the central office or the subscriber station.

It is still another object of the invention to provide a plurality of voltage booster circuits each having a switch means for controlling the flow of subscriber circuit current toward the subscriber station and a switch means for controlling the flow of subscriber circuit current away from the subscriber station.

Yet another object of the invention is to provide a voltage booster circuit of the above character in which the conductive states of the different switch means are controlled in accordance with the polarity with which the central office battery is connected across the subscriber line conductors and in accordance with the potential between ground (one pole of the central office battery) and the respective subscriber line conductors, the latter conditions being determined by the positions of ground switches at the subscriber station and at the central office.

It is another object of the invention to provide a voltage booster circuit including a plurality of switch means in which the conduction of at least one of the switch means causes subscriber line current to flow through an auxiliary DC source which is in power aiding relationship thereto.

Still another object of my invention is to provide a plurality of voltage booster circuits in which either of the switch means in one booster network can be rendered conducting independently of the conduction of either switch means in the other booster network, there being a set of conduction states in the switch means of the different voltage booster circuits corresponding to each boost condition required by the subscriber circuit.

It is yet another object of the invention to provide a voltage boosting arrangement wherein the amount of boost voltage added in response to one set of central office and subscriber circuit conditions is substantially the same as that boost voltage added during any other set of central office and subscriber circuit conditions.

Generally speaking, the invention contemplates a pair of voltage booster circuits, each booster circuit being connected in series with a respective side of the subscriber line. Each booster circuit includes first and second switch means and at least one source of boost voltage. A first switch means in each booster network completes a path for the flow of subscriber circuit current from the central office to the subscriber station, and a second completes a path for the flow of current from the subscriber station toward the central office. Because the operative state of each booster circuit is determined both by the polarity of the voltage between the subscriber line conductors and by the voltage between ground and each respective subscriber line conductor (as determined by the positions of ground switches at the central office and subscriber station) and is independent of the operative state of the other booster circuit, each booster circuit operates to maximize the current flowing in its respective side of the subscriber line without regard to the operative condition of the booster circuit in the other side of the subscriber line.

Under normal operating conditions the current through one of the booster circuits also flows through the other, and one or both of the booster circuits add a boost voltage in power aiding relationship to this common current. This condition is maintained despite reversals in the polarity of battery and the consequent reversals in the direction of flow of subscriber circuit current. Under the special operating conditions which exist in telephone systems utilizing Strowger Automatic Toll Ticketing, and the other operating conditions heretofore mentioned, however, the current through each booster circuit flows in its own separate path and each of these currents is increased by the voltage booster source of the booster circuit in series therewith. Thus, the current in the high resistance subscriber circuit is boosted to a sufficiently high value under all operating conditions.

DESCRIPTION OF THE INVENTION

Figure 1:
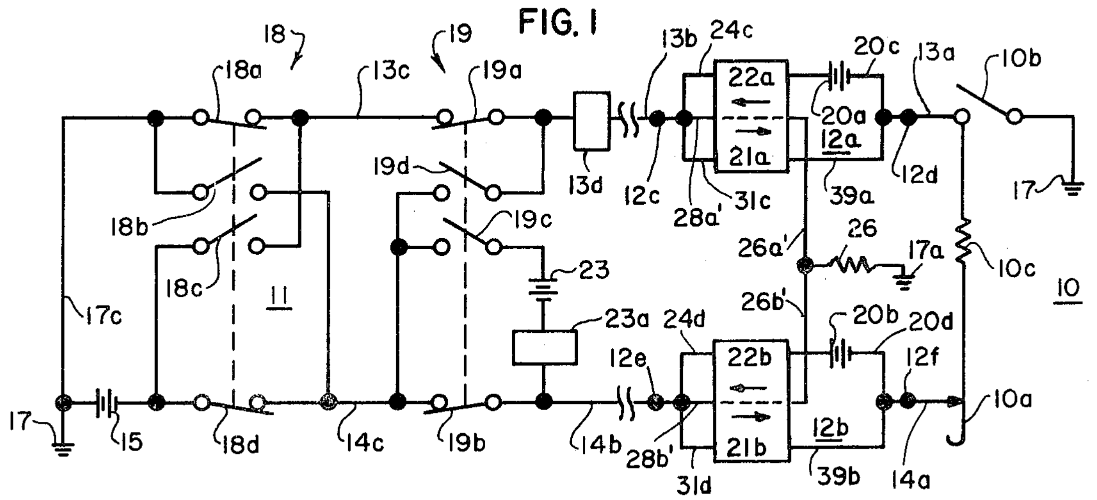
FIG. 1 is a schematic diagram which illustrates one embodiment of the invention and the telephone system circuitry with which it operates.

Referring to FIG. 1 there is shown a subscriber station 10 which is energized by the central office equipment 11 through a voltage boosting arrangement including voltage booster circuits **12*a* and 12*b*. Conductors 13*a* and 14*a* represent the telephone line conductors which connect subscriber station 10 to the central office 11**. It will be understood that FIG. 1 shows only that portion of the central office and subscriber stations necessary to illustrate the operation of the invention.

Subscriber station 10 includes a set of dial contacts **10*a* and a ground switch 10*b* such as, for example, a spotter dial, the remainder of the subscriber set being shown by a symbol 10*c*** representing its impedance.

The central office equipment 11 includes a central office battery 15 having its positive terminal connected to earth ground 17 (as is the common telephone practice), a polarity reversal switch 18 and a central office dialing switch 19, the latter switch being utilized with those Strowger Automatic Toll Ticketing systems which utilize a spotter dial and a spotter battery. It will be understood that, while the following description deals principally with the latter type of Strowger Automatic Toll Ticketing system, the voltage boosting circuit of the invention is equally effective in other automatic toll ticketing systems and in telephone systems having local prepay stations or utilizing ground start foreign exchange. In systems of the latter type no central office dialing switch or spotter battery is required, the dialing interruptions being impressed upon current drawn from central office battery 15.

Polarity reversal switch 18 includes normally closed contacts **18*a* and 18*d* and normally open contacts 18*b* and 18*c* all of which operate in unison. When contacts 18*a* and 18*d* are closed and contacts 18*b* and 18*c* are open, conductor 13*c*, (known as the "tip" conductor) is positive with respect to conductor 14, (known as the "ring" conductor). When, however, switch contacts 18*a* and 18*d* are opened and contacts 18*b* and 18*c* are closed, ring conductor 14*c* is rendered positive from tip conductor 13*c*. Thus, the operation of polarity reversal switch 18*c*** reverses the polarity of the ring to tip voltage.

Central office dialing switch 19, which initiates the dialing operation is Strowger Automatic Toll Ticketing systems, includes normally closed contacts **19*a* and 19*b* and normally open contacts 19*c* and 19*d* all of which operate in unison. When contacts 19*a* and 19*b* are closed and contacts 19*c* and 19*d* are open, as shown in FIG. 1, tip and ring conductors 13*c* and 14*c* are connected to the tip and ring sides of the subscriber line, 13*b* and 14*b* respectively this condition prevails when no dialing operation is taking place. When, however, dialing is engaged in contacts 19*a* and 19*b* are opened and contacts 19*c* and 19*d* are closed, tip and ring conductors 13*b* and 14*b* are joined together and, in turn, connected to ground 17 through conductor 14*c*, switch contact 18*d* and central office battery 15**.

The voltage boosting arrangement of the invention includes a pair of substantially similar booster networks **12*a* and 12*b*. It will be noted that booster network 12*a* includes terminals 12*c* and 12*d* and that booster network 12*b* includes terminals 12*e* and 12*f*. As will be seen presently, these pairs of terminals 12*c*, 12*d* and 12*e*, 12*f* serve alternately and severally as input and output terminals to the respective booster networks. Booster networks 12*a* and 12*b*** are shown in block form in FIG. 1 and in schematic form in FIG. 2. Corresponding parts of the two booster networks are labeled with the same numerical symbol but differing alphabetic postscripts, the postscript "*a*"being associated with booster network **12*a*** and the postscript "*b*" being associated with booster network **12*b***. Thus, description of the operation of either booster network will be understood to be equally applicable to the remaining booster network.

In order to simplify the description of the telephone circuit conditions to which the voltage boosting arrangement of the invention must respond, it will be assumed that the booster networks **12*a* and 12*b*** attain whatever operative states are necessary to allow the flow of the subscriber circuit currents under discussion. The circuit details of these booster networks attaining the above results will be described more fully presently.

When polarity reversal switch 18 and ground switch 19 are in the positions shown in FIG. 1, the tip conductor **13*b* is positive with respect to the ring conductor 14*b* as shown by the direction of central office battery 15. Consequently, subscriber circuit current flows from central office battery 15 through conductor 17*c*, switch contact 18*a*, conductor 13*c*, switch contact 19*a*, the coil of a polarized relay 13*d*, conductor 13*b*, booster network 12*a*, and conductor 13*a* to the subscriber station 10; the path for the return of subscriber circuit current to the central office battery includes conductor 14*a*, switch 10*a*, booster network 12*b*, conductor 14*b*, switch contact 19*b* conductor 14*c*, switch contact 18*d*. Thus, current flows toward the subscriber set in tip conductor 13*a* and away from the subscriber set in ring conductor 14*a*. Similarly, when the operation of polarity reversal switch 18 causes the polarity of the ring to tip voltage to reverse, current flows toward the subscriber station, through booster network 12*b* , through the ring conductor 14*b* and away from the subscriber station, through booster network 12*a*, through the tip conductor 13*b***. The above described telephone system current flow conditions are the closed loop operating conditions.

When the contacts of central office dialing switch 19 are reversed from the positions shown in FIG. 1, the telephone system assumes its dialing state. Under these conditions central office battery 15 is removed from across subscriber line conductors **13*b* and 14*b* and a spotter battery 23 is connected thereacross in its place to provide dial pulsing energy during the dialing operation. As a result, spotter battery 23 energizes the subscriber circuit by producing a current flow through the path including switch contacts 19*c* and 19*d*, conductor 13*b*, booster network 12*a*, conductor 13*a*, dial contacts 10*a* and subscriber set 10*c*, conductor 14*a*, booster network 12*b*, conductor 14*b* and the coil of a pulsing relay 23*a*. Thus, while the telephone system of FIG. 1 is in its dialing state, current flows toward the subscriber station 10 in tip conductor 13*a* and away from the subscriber station in ring conductor 14*a*** whereby one of the closed loop operating conditions is established. This may be referred to as the dialing closed loop function.

When subscriber circuit, party identifying ground switch **10*b* is closed as the telephone system is in its dialing state, grounded loop operating conditions are produced. When the grounded loop operating conditions exist, subscriber station ground switch 10*b* , being closed, connects the positive terminal of central office battery 15 (which is at the highest potential in the telephone system) to conductors 13*a* and 14*a*, while central office dialing switch 19** (position reversed from that of FIG. 1 to accommodate dialing) connects the negative terminal of central office battery 15 to conductors 13*b* and 14*b* through switch contacts 19*d* and 19*c* respectively. As a result, current flows toward the central office, that is, toward the left in FIG. 1 through conductors 13*a* and 14*a*, that is in both the tip and the ring conductors. This amounts to a reversal in the direction of current flow in the tip conductor (13*a* and 13*b*) each time switch 10*b* is closed during dialing, the direction of current flow in the ring conductor (14*a* and 14*b*) being unaffected by the operation of the switch 10*b* during dialing.

Because reversals in the direction of current flow in the tip conductor 13*a* (and the resultant energization of polarized relay 13*d*) during dialing, can be made to occur at different stages in the dialing operation of different subscribers, the latter reversal can be utilized to identify a calling subscriber from among a plurality of party line subscribers for billing purposes. The use of reversals in the direction of tip current flow during dialing for party identification is known as Strowger Automatic Toll Ticketing.

From the foregoing, it is apparent that a voltage booster arrangement for telephone systems which are subject to both closed loop and grounded loop operating conditions must have a plurality of operative states. In a first, closed loop operative state as when conductor 13*b* is positive with respect to conductor 14*b* and switch 18 is in the position shown in FIG. 1, a voltage booster source 20*b* must be inserted in power aiding relationship to a current which flows toward the subscriber station in tip conductor 13*a* and away from the subscriber station in ring conductor 14*a*; in a second, closed loop operative state as when conductor 13*b* is negative with respect to conductor 14*b* and switch 18 is in a position opposite to that shown in FIG. 1, a voltage booster source 20*a* must be inserted in power aiding relationship to a current which flows toward the subscriber station in the ring conductor 14*a* and 14*b* and away from the subscriber station in the tip conductor. Additionally, in a third, grounded loop operative state, as when 10*b* is closed and party identification is taking place, one voltage booster source 20*a* must be inserted in power aiding relationship to a current which flows away from the subscriber station in tip conductor 13*a* and another booster source 20 *b* must be inserted in power aiding relationship to a current which flows away from the subscriber station in ring conductor 14*a*. It will be understood that the connotations of the terms "first operative state" and "second operative state" as used herein have no relevance to the order of operation of the circuit of the invention and are used only to distinguish different conditions which exist during operation for the purpose of description.

From FIG. 1 it will be seen that the present invention contemplates a subscriber loop between a subscriber station 10 and central office 11. Furthermore, each side of the subscriber loop includes a boosting network shown at 12*a* and 12*b* respectively. Each network includes a plurality of inverse-parallel connected switch means, the first switch means in each network shown at 21*a* and 21 *b* serving as off-on conducting means while the second switch means in each network shown at 22*a* and 22*b* each being connected in series with a suitable source of boosting voltage 20*a* and 20*b* respectively.

To the end that the voltage boosting arrangement of FIG. 1 may additively increase the flow of subscriber circuit current when the voltage boosting arrangement is to operate in the above named first operative state, that is when the polarity reversal switch 18 causes central office battery 15 to render conductor 13*b* positive from conductor 14*b*, which is the position shown in FIG. 1, a first switch means 21*a* is provided in booster network 12*a* and a second switch means 22*b* is provided in booster network 12*b*. First switch means 21*a* serves to complete a path for the flow of subscriber circuit current from terminal 12*c* to terminal 12*d*, as through a closed switch, and second switch means 22*b* serves to complete a path for the flow of subscriber circuit current from terminal 12*f* to terminal 12*e* through a booster source 20*b*. As a result, the concurrent conduction of switch means 21*a* and 22*b* renders conductor 13*a* positive from conductor 14*a* by a voltage equal to the sum of the voltages of central office battery 15 and booster source 20*b*.

When central office ground switch contacts 19*c* and 19*d* are closed and subscriber station ground switch 10*b* is open, the subscriber circuit attains its dialing state, as described previously. Under these conditions spotter battery 23 causes current to flow toward the subscriber station in tip conductor 13*a* and away from the subscriber station in ring conductor 14*a*, thereby energizing a pulsing relay 23*a* when dial contact 10*a* is closed. Accordingly, the insertion of a voltage booster source which is in power aiding relationship to the dialing current requires the conduction of switch means 21*a* and 22*b*.

When the subscriber station ground switch 10*b* is closed during dialing, that is when central office ground switch contacts 19*c* and 19*d* are closed, the grounded loop operating conditions are produced. While the grounded loop operating conditions persist, current flows away from the subscriber station in both the ring and the tip conductors, as described previously. Accordingly, the insertion of voltage booster source in power aiding relationship to each of the latter currents requires the conduction of switch means 22*a* and 22*b*.

Telephone central offices using "ground start" systems require still further operative states of a voltage boosting arrangement. These systems require the flow of a current from the central office through ground and a subscriber station ground switch which returns to the central office through one of the subscriber line conductors. This current is utilized to energize a ground start relay which, when operated, connects both sides of the subscriber line to a trunk circuit. Consequently, the insertion of a voltage booster source in power aiding relationship to a ground start current requires the conduction of that second switch means 22*a* and 22*b* which is in the side of the subscriber line which carries the ground start current.

From the foregoing, it is apparent that despite changes in the directions of current flow in subscriber line conductors 13*a* and 14*a* due to changes in the polarity of the voltage between conductors 13*b* and 14*b* and due to the connection of ground potential to the subscriber line conductors at the subscriber station and the central office, the control of the conduction of switch means 21*a*, 22*a*, 21*b* and 22*b*, as above described, will cause a booster source to be connected in power aiding relationship to each of the possible subscriber circuit currents, thus achieving an important object of the invention.

Figure 2:
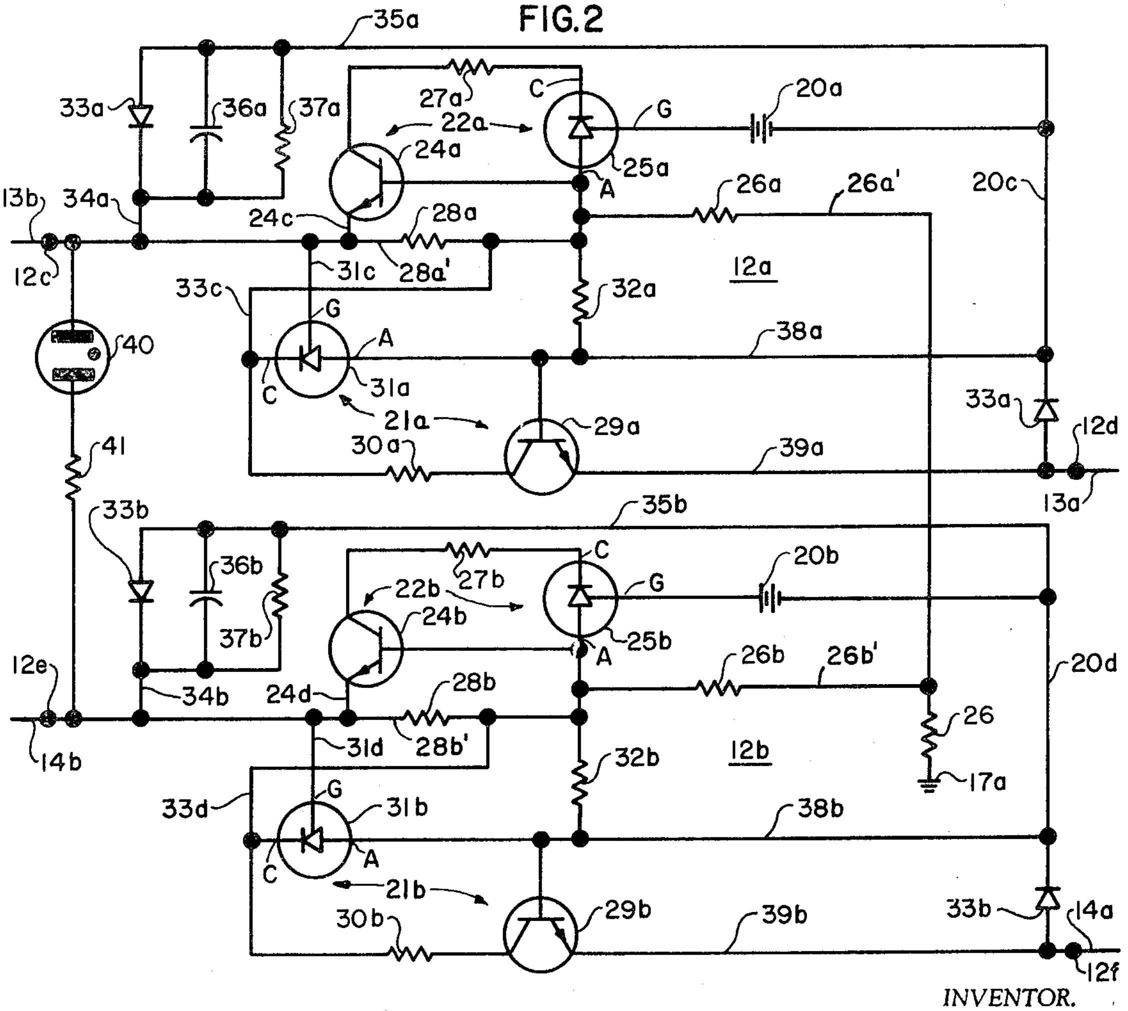
FIG. 2 is a schematic diagram showing the circuit detail of one form of the invention and FIG. 3 is a schematic diagram showing the circuit detail of a modified form of the invention.

Referring to FIG. 2 there is shown the circuit detail of first switch means 21*a* and 21*b* and second switch means 22*a* and 22*b* of booster networks 12*a* and 12*b*. Each of the above switch means includes a pair of variable conducting elements for controlling the flow of subscriber circuit current in a predetermined direction between the terminals of the respective booster network.

Switch means 22*a* includes a line-source responsive variable conducting element 24*a*, here shown as an NPN-transistor having an emitter lead 24*c* connected to tip conductor 13*b*, and a latching variable conducting element 25*a*, here shown as a thyristor, having an anode A, a cathode C and a gate G. These variable conducting elements operate in conjunction with one another to control the flow of subscriber circuit current from terminal 12*d* to terminal 12*c* through booster source 20*a*. Similarly, switch means 21*a* includes a line-source responsive variable conducting element 29*a*, here shown as an NPN-transistor, and a controlled variable conducting element 31*a* which here takes the form of a thyristor having a gate lead 31*c* connected to tip conductor 13*b*. The latter variable conducting elements operate together to control the flow of subscriber circuit current from terminal 12*c* to terminal 12*d*.

Contrary to conventional thyristor usage wherein a pulse of gate-to-cathode current causes an avalanche of anode-to-cathode current in a forward biased device, thyristors 25*a* and 31*a* are biased so that the gate electrodes thereof are positive from the respective cathodes and anodes thereof to cause portions of the current flowing into the gate electrodes thereof to flow out of the cathode and anode electrodes thereof. The usage of thyristors in this manner is described on pages 15 and 16 of the fourth edition of the General Electric SCR Manual. Thus, the gate-to-cathode circuits of thyristors 25a and 31a serve in the manner of control circuits while the gate-to-anode circuits thereof serve in the manner of power circuits.

As described previously, when the positions of central office switches 18 and 19 are such that central office battery 15 renders conductor 14b positive from conductor 13b, the conduction of switch means 21b and 22a are required to boost the voltage between conductors 13a and 14a. The manner in which switch means 21b and 22a are rendered conducting under these circumstances will now be described.

When ring conductor 14b is positive from tip conductor 13b, the latter conductor is connected to the negative terminal of the central office battery. Because a ground junction 17a is at all times connected to the positive pole of the central office battery, it is apparent that under the above conditions ground 17a is positive from tip conductor 13b. This voltage appears across the series connection of trigger current conducting resistors 26 and 26a and the base-emitter junction of line-source responsive transistor 24a resulting in the flow of base-emitter current in the latter transistor. The flow of base-emitter current in transistor 24a, in turn, initiates the flow of subscriber line current through conductor 13a, a diode 33a, serving as a voltage dropping element, a conductor 20c, booster source 20a, the gate-cathode control circuit of thyristor 25a, a current limiting resistor 27a and the collector-emitter power circuit of transistor 24a to conductor 13b, the path for the flow of the foregoing current being completed through the central office equipment, booster network 12b and the subscriber loop.

As described previously, the flow of gate-cathode current in thyristor 25a results in the flow of gate-anode current therein. Consequently, if conductor 13a is positive from conductor 13b, the gate-cathode current produced in thyristor 25a by the above described conduction of transistor 24a, will cause a subscriber line current to flow from conductor 13a, through diode 33a, conductor 20c, booster source 20a, the gate-anode circuit of thyristor 25a, and the base-emitter circuit of transistor 24a to conductor 13b. This gate-anode current increases the conduction of transistor 24a which, in turn, further increases the conduction of thyristor 25a in the manner described. Thus, the connections of the power and control circuits of transistor 24a and thyristor 25a are regenerative, an increase in the conduction of each contributing to an increase in the conduction of the other until both devices saturate. When this occurs, the positive terminal of booster source 20a is joined to terminal 12c, as through a closed switch, and booster source 20a is connected in power aiding relationship to the subscriber line current flowing from terminal 12d to terminal 12c through diode 33a.

In view of the foregoing, it will be seen that transistor 24a responds to the voltage which one of the sources in the central office applies to the subscriber line by initiating conduction through switch means 22a, and that thyristor 25a is responsive to the conduction of transistor 24a to impart to switch means 22a the above described regenerative switching or latching characteristic. Thus, transistor 24a and thyristor 25a comprise cooperating portions of switch means 22a, the base-emitter circuit of source responsive transistor 24a serving as the triggering circuit for switch means 22a, and that the connected power and control circuits of line-source responsive transistor 24a and latching thyristor 25a serving as the triggered circuit of switch means 22a.

While the conduction of second switch means 22a is triggered by the voltage which central office battery 15 causes to appear between ground junction 17a and tip conductor 13b, the conduction of first switch means 21b is triggered by the voltage which central office battery 15, acting through booster network 12a and the subscriber circuit, causes to appear between ring conductor 14b and ring conductor 14a. This voltage across booster network 12b produces a triggering current through a conductor 28b and trigger current conducting resistors 28b and 32b, which resistors serve to connect the control circuit of line-source responsive conducting means 29b between terminal 12e and terminal 12f. This triggering current causes a regenerative increase in the conduction of thyristor 31b and transistor 29b (in the manner described previously with reference to thyristor 25a and transistor 24a) to connect conductor 14b to conductor 14a, through conductors 31d and 39b, as through a closed switch.

If resistor 26 is of a sufficiently high value, the conduction of switch means 21b may also be triggered by the voltage which central office battery 15 produces between subscriber line conductors 14b and 13b. The latter voltage causes a current to flow through the path including conductor 14b, conductor 31d, the gate-cathode control circuit of thyristor 31b, a conductor 33d, resistors 26b and resistor 26b, conductors 26b' and 26a', resistor 26a, the base-emitter control circuit of transistor 24a and conductor 24c to conductor 13b and thereby initiates the flow of current in the gate-anode power circuit of thyristor 31b. Because the gate-anode power circuit of thyristor 31b connects the control circuit of transistor 29b between conductors 14b and 14a, and because conductor 14b is, at this time, positive from conductor 14a, the conduction of thyristor 31b initiates a regenerative increase in the conduction of both thyristor 31b and transistor 29b. Thus, a trigger current through thyristor 31b as well as a trigger current through transistor 29b can initiate conduction in switch means 21b and the latter can be characterized as having two control circuits.

If, however, the resistance of resistor 26 is so low that the junction of resistors 26a and 26b is substantially connected to ground potential, there is no tendency for trigger current to flow between the subscriber line conductors through thyristor 31b and resistors 26b and 26a. Consequently, if the resistance of resistor 26 is low, switch means 21b can only be triggered by current from terminal 12e to terminal 12f through transistor 29b and resistors 28b and 32b. Either or both of the two above described methods of triggering switch means 21b can be utilized when telephone system environmental conditions are such that one or both methods of triggering are advantageous.

The above described methods of triggering first switch means 21b are necessary since transistor 29b cannot be turned on by the voltage appearing between ground 17a and conductor 14a through resistors 26, 26b and 32b (as occurred for the turn-on of second switch means 22a by the voltage appearing between ground 17a and conductor 13b through resistors 26 and 26a). This results from the previously assumed condition that conductor 14b is positive from conductor 13b. When the latter condition exists, conductor 14b is at ground potential. As a result, no voltage appears across trigger current conducting resistors 26b and 26 and, therefore, no trigger current can flow therethrough to trigger switch means 21b.

From the foregoing, it will be seen that when conductor 14b is positive from conductor 13b, trigger currents are produced which render conducting switch means 21b and 22a . Under these conditions, ring conductor 14b is connected to ring conductor 14a, as through a closed switch, and tip conductor 13a is connected to tip conductor 13b through booster source 20a. As a result, ring conductor 14a is positive from tip conductor 13a by a voltage equal to the sum of the voltages of central office battery 15 and booster source 20a.

The above conduction conditions in the switch means of the different booster networks comprise the second operative state of the voltage boosting arrangement.

While it appears that the two methods of triggering switch means 21b differ substantially from one another, a more careful analysis will reveal that the difference therebetween is one only of detail. This becomes more apparent when it is considered that the control current conducting resistors 26b and 26a connect the trigger circuit of thyristor 31b between subscriber line conductors 14b and 13b through conductors 31d and 33d and the base-emitter circuit of transistor 24a. On the other hand, the control current conducting resistors 28b and 32b connect the trigger circuit of transistor 29b between subscriber line conductors 14b and 13b through the series connection of the subscriber line, the subscriber telephone set and a switch means of the booster network 12a. In both methods of triggering a control circuit capable of energizing switch means 21b is energized by the voltage which the central office establishes between subscriber line conductors 14b and 13b.

When polarity reversal switch 18 causes central office battery 15 to render tip conductor 13b positive from ring conductor 14b, switch means 22b is rendered conducting by the voltage appearing across trigger current conducting resistors 26 and 26b which, in turn, connect the base-emitter control circuit of transistor 24b between ground 17a and ring conductor 14b through emitter lead 24d. Similarly, under these conditions switch means 21a is rendered conducting by the voltage appearing across trigger current conducting means 28a and 32a which connect the base-emitter circuit of transistor 29a between tip conductor 13b and tip conductor 13a. The manner in which conduction is initiated in switch means 22b and 21a is similar to that described previously with respect to the energization of switch means 22a and 21b, respectively. When switch means 22b and 21a are conducting, terminal 12c is connected to terminal 12d, as through a closed switch, and terminal 12f is connected to terminal 12e through booster source 20b. As a result, tip conductor 13a is positive from ring conductor 14a by a voltage equal to the sum of the voltages of central office battery 15 and booster source 20b. This set of conduction conditions in the switch means of the different booster networks comprises the first operative state of the voltage boosting arrangement.

As described previously with reference to FIG. 1, the closure of switch contacts 19c and 19d initiates operation of the telephone circuit in its dialing state. Given the latter condition, central office battery 15 renders ground junction 17a of FIG. 2 positive from ring conductor 14b, thereby providing a trigger current to switch means 22b; and spotter battery 23 renders tip conductor 13bpositive from tip conductor 13a, thereby providing a trigger current to switch means 21a. Because spotter battery 23 also biases the variable conducting elements of switch means 22b and 21a toward conduction under these conditions, switch means 21a conducts to connect terminal 12c to terminal 12d, as through a closed switch, and switch means 22b conducts to connect terminal 12f to terminal 12e through booster source 20b. Thus, the voltage boosting arrangement operates in the above described first operative state to additively increase the voltage between tip conductor 13a and ring conductor 14a and thereby increase the magnitude of the dialing current.

It will be seen that although ground junction 17a is positive with respect to tip conductor 13b, thereby providing a trigger current to switch means 22a at this time, the latter switch means cannot conduct because the semiconductors 24a and 25a thereof are not biased toward conduction by spotter battery 23.

When ground switch 10b is closed at the same time that central office dialing switch contacts 19c and 19d are closed (during dialing), the grounded loop operating conditions are produced. Under the latter conditions, central office battery 15 renders ground junction 17a positive both with respect to tip conductor 13b and with respect to ring conductors 14b and thereby provides trigger currents to both of the second switch means 22a and 22b. Under these same conditions central office battery 15, acting through ground switch 10b, renders conductors 13a and 14a positive with respect to conductors 13b and 14b, respectively, thereby biasing the variable conducting elements of switch means 22a and 22b toward conduction. As a result, second switch means 22a is rendered conducting to connect booster source 20a in power aiding relationship to subscriber circuit current flowing in tip conductor 13a and second switch means 22b is rendered conducting to connect boost source 20b in power aiding relationship to current flowing in ring conductor 14a. This set of conduction conditions in the switch means of the different booster networks is the third operative state of the voltage boosting arrangement.

From the description of the operation of the voltage boosting arrangement in the third operative state, it is apparent that the closure of subscriber station ground switch 10b biases, toward conduction, the variable conducting elements of those second switch means which are connected to ground by the closure of the latter switch. Accordingly, it will be seen that if a subscriber station ground switch were arranged to connect only one side of the subscriber line to ground, the second switch means in only that side of the subscriber line would be biased toward conduction. Consequently, the voltage boosting arrangement of FIG. 2 will operate in telephone systems utilizing the ground start techniques previously explained, that is systems which require the connection of a booster source in power aiding relationship to current flowing in only one side of the subscriber line when the remaining side of the subscriber line is open. These sets of conduction conditions in the switch means of the different booster networks which are required to accommodate the possible types of ground start currents are additional operative states of the voltage boosting arrangement.

Thus, it will be seen that the voltage boosting arrangement of the invention furnishes a fixed boost voltage in power aiding relationship to each current flowing in the subscriber circuit in spite of changes in the respective directions of flow thereof for supervisory or control purposes.

Because of the distributed capacitance and inductance of a subscriber line, current in the ring and tip conductors may not instantaneously flow in the direction anticipated. While, for example, the central office battery is connected to the subscriber circuit with a polarity such that current would ordinarily be expected to flow in the subscriber circuit in a given direction, the reactive energy stored in the distributed capacitance and inductance of the subscriber line may result in the flow of subscriber circuit current in the opposite direction. The latter is detrimental to the operation of the system and hence, this reactive energy must be dissipated as rapidly as possible. One effective method of eliminating this detrimental condition is to provide paths for the flow of transient currents which dissipate the reactive energy in the form of heat in the resistance of the subscriber line. To this end, unidirectional current bypass means, herein comprising diodes 33a' and 33b', are provided. These diodes permit the flow of current away from the subscriber station when the second switch means in respective sides of the subscriber line are nonconducting. In the embodiment of FIG. 2 diodes 33a' and 33b' are connected across booster networks 12a and 12b by conductors 34a and 35a, and conductors 34b and 35b, respectively.

To the end that voltage booster networks 12a and 12b accomplish their voltage boosting function without substantially interfering with the AC or voice signal component of the subscriber line current, the capacitors 36a and 36b are provided. These capacitors, by presenting a low resistance to AC, bypass any AC signals around the booster networks. Resistors such as 37a and 37b may be added to one or both of the booster networks to slow the dynamic response of respective voltage booster networks to reversals in the polarity of the voltage between the tip and ring conductors. These resistors act as loads across respective serially connected second switch means and booster sources and therefore tend to prolong the conduction of respective second switch means.

To the end that the conduction of the second switch means 22a and 22b in the booster networks 12a and 12b may preclude the conduction of the first switch means 21a and 21b respectively, the voltage dropping means 33a and 33b, here shown as diodes, are provided. As described previously, the currents through second switch means 22a and 22b flow through diodes 33a and 33b, respectively. These currents produce voltage drops across the latter diodes which are applied in reverse biasing relationship to the control circuits of transistors 29a and 29b, respectively, by conductors 38a and 38*b*. As a result, first switch means 21*a* and 21*b* can conduct only after the termination of conduction in second switch means 22*a* and 22*b*, respectively.

As described previously, the operative states of the first switch means in each booster network depend upon the polarity appearing between ring conductor 14*b* and tip conductor 13*b* and the operative states of the second switch means in each booster network depend upon the voltage appearing between ground and one of the subscriber lnne conductors 13*b* or 14*b*. While it is advantageous for the switch means of the different booster networks to respond to polarity changes in the ring to tip voltage during reverse battery supervision, this is not necessarily the case when ringing current is present in the subscriber circuit.

Normally during ringing after the subscriber lifts his handset, an AC ringing generator is connected in series with the central office battery 15 to energize the ringer of a subscriber set by passing a mixed AC or DC current through the subscriber line conductors. Because the ringing voltage is usually of an amplitude greater than the voltage of the central office battery, the instantaneous polarity of the ring to tip voltage changes each time the polarity of the AC ringing voltage reverses. While it is beneficial for the voltage boosting arrangement to follow the instantaneous ring to tip voltage before the subscriber lifts the handset, thereby additively increasing the ringing voltage, it is even more important that the voltage boosting arrangement produce a net DC boost voltage during ringing after the subscriber lifts his handset to assist in the energization of a DC sensitive trip relay. The operation of this trip relay disconnects the ringing generator from the subscriber circuit and thereby terminates the ringing sound. The foregoing is standard practice in telephone communications and is therefore not included in the present drawings.

Because the ring to tip voltage (after the pickup of the handset but before tripping) is the sum of the central office battery voltage and the ringing voltage, it is apparent that those half-cycles of the ringing voltage to which the central office battery voltage is additive controls the instantaneous ring to tip voltage for a greater percentage of the ringing voltage cycle than those half-cycles of the ringing voltage to which the central office battery voltage is subtractive. Consequently, the booster network produces DC boost voltage with a polarity which assists the operation of the trip relay for a greater percentage of the ringing voltage cycle than it produces a boost voltage with a polarity which opposes operation of the trip relay. Thus, a net DC boost voltage is produced during ringing.

If the amount of net DC voltage inserted by the booster arrangement of the invention during ringing is insufficient for tripping purposes, a trip relay biasing means 40, here shown as a neon tube having a breakdown voltage greater than the central office battery voltage, and a current limiting resistor 41 may be provided. Neon tube 40 draws more current through the coil of the central office trip relay when the central office battery additively increases the ringing voltage than is drawn through the coil of the trip relay when the voltage of the central office battery is in opposition to the ringing voltage. Consequently, the flow of current in the coil of the trip relay in a direction favorable to tripping predominates over that which flows therethrough in opposition to tripping.

Figure 3:
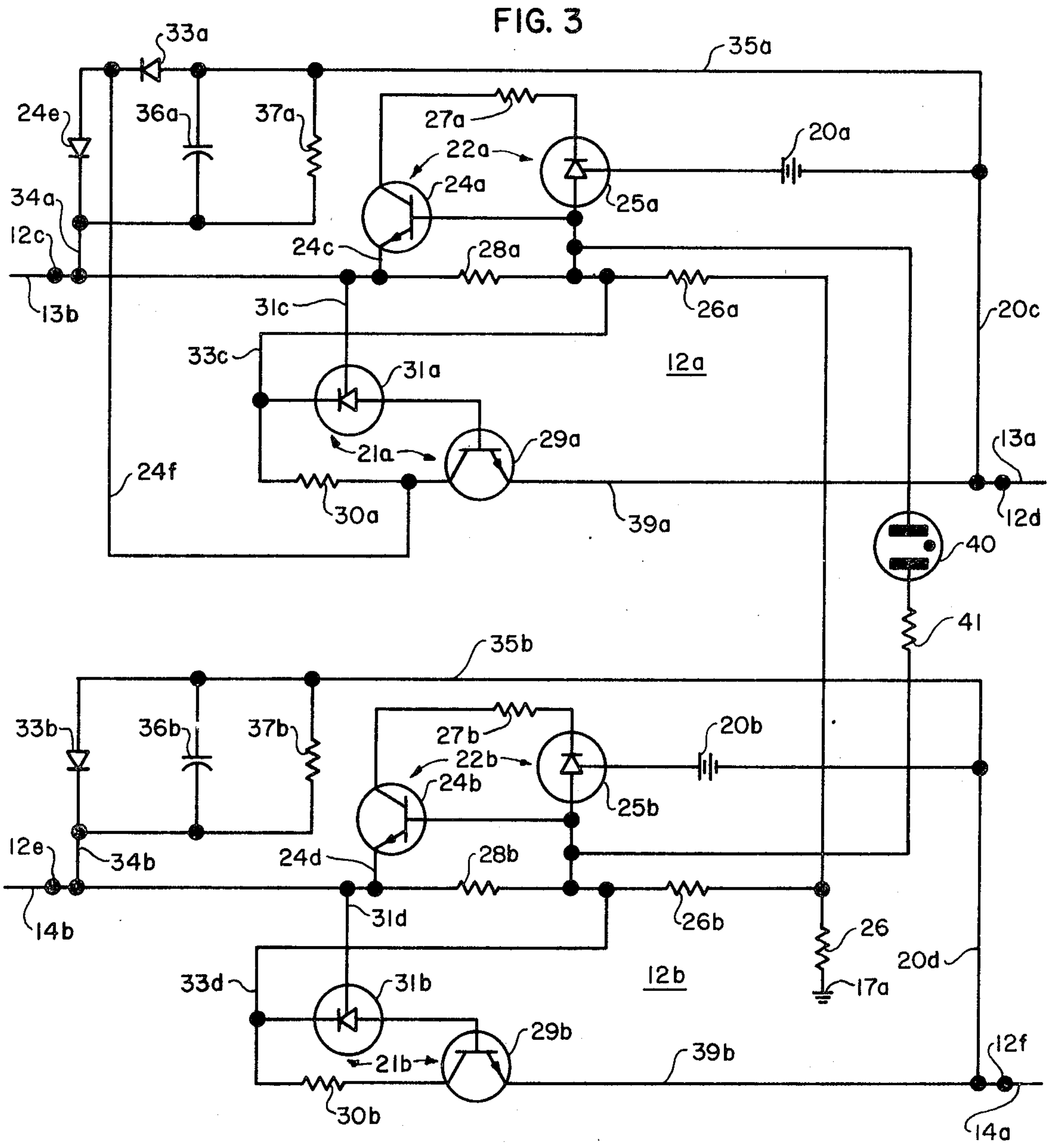

If it is desirable that the conduction of first switch means 21*a* and 21*b* be controlled solely in accordance with the current which the voltage between ring conductor 14*b* and tip conductor 13*b* produces in resistors 26*b* and 26*a*, this may be accomplished by the circuit of FIG. 3. This circuit is similar to the circuit of FIG. 2 and like parts are, therefore similarly numbered.

In the circuit of FIG. 3 components corresponding to resistors 32*a* and 32*b*, conductors 38*a* and 38*b* and diodes 33*a* and 33*b* of FIG. 2 have been eliminated and resistor 26 is made high in resistance. As a result, when tip conductor 13*b* is positive from ring conductor 14*b*, switch means 21*a* and 22*b* of FIG. 3 are (under the closed loop operating conditions) rendered conducting by the voltage which central office battery 15 establishes across resistors 26*a* and 26*b* which connect the control circuits of thyristor 31*a* and transistor 24*b* across subscriber line conductors 13*b* and 14*b*. The above voltage causes a current to flow from conductor 13*b* through conductor 31*c*, the gate-cathode circuit of thyristor 31*a*, conductor 33*c*, resistors 26*a* and 26*b*, the base-emitter control circuit of transistor 24*b* and conductor 24*d* to conductor 14*b*. Similarly, when the polarity of the voltage between the ring and tip conductors is reversed from that just described, switch means 21*b* and 22*a* are rendered conducting by the current which central office battery 15 establishes from conductor 14*b* through conductor 31*d*, the gate-cathode circuit of thyristor 31*b*, conductor 33*d*, resistors 26*b* and 26*a*, the base-emitter circuit of 24*a* and conductor 24*c* to conductor 13*b*.

When the circuit of FIG. 3 is in its dialing state, spotter battery 23, instead of central office battery 15, produces the ring-to-tip voltage which renders conducting switch means 21*a* and 22*b*, in the manner just described. When, however, the closure of switch 10*b* produces the previously described grounded loop operating conditions, second switch means 22*a* and 22*b* are rendered conducting by the voltage which central office battery 15 establishes between ground 17*a* and conductors 13*b* and 14*b*, respectively, this result being achieved in the manner described with reference to the effect of switch 10*b* on the operation of switch means 22*a* and 22*b* in FIG. 2.

In the event that the telephone circuitry, in which the voltage boosting arrangement of FIG. 3 is to operate, is of the type which utilizes a spotter battery and the continuous connection of a large resistor between ground and tip conductor 13*a* at the subscriber station, it may be desirable under certain circuit conditions to establish a trigger current through second switch means 22*a* which is greater than that available from ground 17*a*. To this end a voltage dropping diode 24*e* and a conductor 24*f* may be connected as shown in FIG. 3. If the latter elements are provided, a trigger current can flow from central office battery 15 through subscriber station ground 17, conductor 13*a*, conductors 20*c* and 35*a*, diode 33*a*', conductor 24*f*, resistor 30*a*, conductor 33*c*, the base-emitter circuit of transistor 24*a* (to energize switch means 22*a*) and conductor 13*b* to central office battery 15.

A further difference between the circuit of FIG. 3 and the circuit of FIG. 2 is that the trip relay biasing means 40 and its current limiting resistor 41, when utilized, are connected between the ring and tip conductors through the bases of transistor 24*a* and 24*b*. Because neon tube 40 is connected in parallel with trigger current conducting resistors 26*a* and 26*b*, and because neon tube 40 presents a low impedance after the breakdown thereof, it is apparent that the impedance between the bases of transistor 24*a* and 24*b*, which determines the strength of the control current for the different switch means, has one value before neon tube 40 breaks down and a second, lower value thereafter.

As described previously, the breakdown voltage of trip relay biasing means 40 is selected so that breakdown only occurs when ringing voltage is present. As a result, neon tube 40 has little effect on the operation of booster networks 12*a* and 12*b* when ringing voltage is not present, but increases the switching speeds of the different switch means when ringing voltage is present, that is, when the rapid switching of the different switch means allows booster networks 12*a* and 12*b* to introduce a net DC boost into the subscriber circuit for tripping purposes.

Neon tube 40 conducts more current when the central office battery voltage is additive to the ringing voltage than when the central office battery voltage is subtractive therefrom. Therefore, it is apparent that more trigger current is available to turn on that second switch means 22*a* or 22*b* which controls the insertion of a booster source beneficial to tripping than that trigger current available to turn on the switch means which controls the insertion of a booster source detrimental to tripping. Thus, the conduction of those switch means which are beneficial to tripping are initiated more rapidly than the conduction of those switch means which are detrimental to tripping.

While the present invention has been illustrated with a Strowger Automatic Toll Ticketing system that uses a spotter dial and a spotter battery, it will be understood that it is equally effective when used with circuitry including ticketing systems which do not use spotter battery or spotter dials, but identify by either detecting a difference between ring and tip current or detecting the absence of such a difference. In addition the voltage boosting arrangement of the invention is effective in additively increasing the subscriber circuit currents in telephone systems which utilize local prepay stations and ground start foreign exchange as well as ordinary non grounded subscriber loops.

In view of the foregoing, it is apparent that a voltage boosting arrangement constructed in accordance with the invention will provide a substantially constant voltage boost for increasing the current flow in the subscriber circuit despite central office polarity reversals and despite the connection of the ring and tip sides of the subscriber line to each other and to ground, these results being achieved without detrimental effect upon other telephone system operations.

It will be understood that the foregoing embodiment is shown for explanatory purposes only and may be changed and modified without departing from the spirit and scope of the appended claims.

I claim:

1. In a voltage boosting arrangement for telephone systems which utilize reversals in the connections of a central office battery to the conductors of a subscriber line for supervisory purposes, in combination, a booster network for each conductor; each booster network including first and second terminal means for disposition in series with one conductor of a subscriber line, each booster network also including first and second switch means each having a regenerative switching characteristic and each having a triggered circuit and a triggering circuit, means for connecting the triggered circuit of said first switch means in series, current conducting relationship between said first and second terminal means, means for connecting the triggered circuit of said second switch means in series, current conducting relationship between said second and first terminal means, booster voltage source means, means for connecting said booster voltage source means in series with the triggered circuit of one of said switch means, means for connecting the triggering circuit of said first switch means to each of the subscriber line conductors and means for connecting the triggering circuit of said second switch means between ground and one of said terminal means.

2. In a voltage boosting arrangement as set forth in claim 1, unidirectional current bypass means and means for connecting said unidirectional current bypass means between said second and first terminal means.

3. In a voltage boosting arrangement as set forth in claim 1, trip relay biasing means and means for connecting said trip relay biasing means between the conductors of the subscriber line.

4. In a voltage boosting arrangement as set forth in claim 1, a voltage dropping diode, means for connecting said voltage dropping diode in current conducting relationship between said second switch means and one of said terminal means and means for connecting said voltage dropping diode in reverse biasing relationship to the triggering circuit of said first switch means.

5. In a voltage boosting arrangement for telephone systems which utilize reversals in the connections of a central office battery to the conductors of a subscriber line for supervisory purposes, in combination, a booster network for each conductor; each booster network including first and second terminal means for disposition in series with one conductor of a subscriber line, each booster network also including first and second switch means each having a regenerative switching characteristic and each having a triggered circuit and a triggering circuit, means for connecting the triggered circuit of said first switch means in series, current conducting relationship between said first and second terminal means, means for connecting the triggered circuit of said second switch means in series, current conducting relationship between said second and first terminal means, booster voltage source means, means for connecting said booster voltage source means in series with the triggered circuit of one of said switch means, means for connecting the triggering circuit of said first switch means to each of the conductors of the subscriber line, means for connecting the triggering circuit of said second switch means between ground and one of the subscriber line conductors.

6. In a voltage boosting arrangement for telephone systems which utilize reversals in the connections of a central office battery to the conductors of a subscriber line for supervisory purposes, in combination, a booster network for each conductor; each booster network including first and second terminal means for disposition in series with one conductor of a subscriber line, each booster network also including first and second switch means each having a regenerative switching characteristic and each having a triggered circuit and a triggering circuit, means for connecting the triggered circuit of said first switch means in series, current conducting relationship between said first and second terminal means, means for connecting the triggered circuit of said second switch means in series, current conducting relationship between said second and first terminal means, booster voltage source means, means for connecting said booster voltage source means in series with the triggered circuit of one of said first switch means, means for connecting the triggering circuit of said first switch means between said first and second terminal means, means for connecting the triggering circuit of said second switch means between the grounded pole of the central office battery and one of the subscriber line conductors.

7. In a voltage boosting arrangement for telephone systems which utilize reversals in the connections of a central office battery to the conductors of a subscriber line for supervisory purposes and which are subject to the grounding of the subscriber line at locations outside the central office, in combination, a pair of booster networks each having first and second terminal means for disposition in series with the respective subscriber line conductors, a first and second switch means in each of said booster networks, each of said switch means having a regenerative switching characteristic and having a triggering circuit, means for connecting said first switch means between the first and second terminal means of respective booster networks to control the flow of subscriber line current toward the subscriber station, means for connecting said second switch means between the second and first terminal means of respective booster networks to control the flow of subscriber line current away from the subscriber station, booster voltage source means, means for connecting said booster voltage source means in series with respective second switch means in power aiding relationship to current flowing therethrough, means for connecting the triggering circuits of said first and second switch means to each of the conductors of the subscriber line and means for connecting the triggering circuits of said second switch means between ground and respective subscriber line conductors.

8. In a voltage boosting arrangement for telephone systems which utilize reversals in the connections of a central office battery to the conductors of a subscriber line for supervisory purposes and which are subject to the grounding of the subscriber line at locations outside the central office, in combination, a pair of booster networks each having first and second terminal means for disposition in series with the respective subscriber line conductors, a first and second switch means in each of said booster networks, each of said switch means having a regenerative switching characteristic and having a triggering circuit, means for connecting said first switch means between the first and second terminal means of respective booster networks to control the flow of subscriber line current toward the subscriber station, means for connecting said second switch means between the second and first terminal means of respective booster networks to control the flow of subscriber line current away from the subscriber station, booster voltage source means, means for connecting said booster voltage source means in series with respective second switch means in power aiding relationship to current flowing therethrough, means for connecting the triggering circuits of said first switch means between the first and second terminal means of respective booster networks and means for connecting the triggering circuits of said second switch means between ground and respective subscriber line conductors.

9. In a voltage boosting arrangement for telephone systems which utilize reversals in the connections of a central office battery to the conductors of a subscriber line for supervisory purposes, in combination, a booster network for each conductor; each booster network including a pair of terminal means for connecting the respective booster network in series with a respective conductor of the subscriber line, each booster network also including a plurality of line-source responsive variable conducting means, a plurality of latching variable conducting means, each of said variable conducting means having a power circuit and a control circuit, means for connecting the power circuit of a first one of said line-source responsive variable conducting means between said terminal means through the control circuit of a first one of said latching variable conducting means, means for connecting the control circuit of said first line-source responsive variable conducting means between said terminal means through the power circuit of said first latching variable conducting means, means for connecting the control circuit of one of said first variable conducting means to each of the conductors of the subscriber line, means for connecting the power circuit of a second one of said line-source responsive variable conducting means between said terminal means through the control circuit of a second one of said latching variable conducting means, means for connecting the control circuit of said second line-source responsive variable conducting means between said terminal means through the power circuit of said second latching variable conducting means, booster voltage source means, means for connecting said booster voltage source means between said terminal means through said second variable conducting means, and means for connecting the control circuit of one of said second variable conducting means to one pole of the central office battery and to one conductor of the subscriber line.

10. A voltage boosting arrangement as set forth in claim 9 in which said first line-source responsive variable conducting means and said second latching variable conducting means comprise thyristors and in which said second line-source responsive variable conducting and said first latching variable conducting means comprise NPN-transistors.

11. In a voltage boosting arrangement for telephone systems which utilize reversals in the connections of a central office battery to the conductors of a subscriber line for supervisory purposes, in combination, a booster network for each conductor; each booster network including a pair of terminal means for connecting the respective booster network in series with a respective conductor of the subscriber line, each booster network also including a plurality of line-source responsive variable conducting means, a plurality of latching variable conducting means, each of said variable conducting means having a power circuit and a control circuit, means for connecting the power circuit of a first one of said line-source responsive variable conducting means between said terminal means through the control circuit of a first one of said latching variable conducting means, means for connecting the control circuit of said first line-source responsive variable conducting means between said terminal means through the power circuit of said first latching variable conducting means, means for connecting the control circuit of one of said first variable conducting means between said terminal means, means for connecting the power circuit of a second one of said line-source responsive variable conducting means between said terminal means through the control circuit of a second one of said latching variable conducting means, means for connecting the control circuit of said second line-source responsive variable conducting means between said terminal means through the power circuit of said second latching variable conducting means, booster voltage source means, means for connecting said booster voltage source means between said terminal means through said second variable conducting means, and means for connecting the control circuit of one of said second variable conducting means to one subscriber line conductor and to one pole of the central office battery.

12. A voltage boosting arrangement as set forth in claim 11 including capacitance means and means for connecting said capacitance means between said terminal means.

13. In a voltage boosting arrangement for telephone systems which utilize reversals in the connections of a central office battery to the conductors of a subscriber line for supervisory purposes, in combination, a booster network for each conductor; each booster network including a pair of terminal means for connecting the respective booster network in series with a respective conductor of the subscriber line, each booster network also including a plurality of line-source responsive variable conducting means, a plurality of latching variable conducting means, each of said variable conducting means having a power circuit and a control circuit, means for connecting the power circuit of a first one of said line-source responsive variable conducting means between said terminal means through the control circuit of a first one of said latching variable conducting means, means for connecting the control circuit of said first line-source responsive variable conducting means between said terminal means through the power circuit of said first latching variable conducting means, means for connecting the power circuit of a second one of said line-source responsive variable conducting means between said terminal means through the control circuit of a second one of said latching variable conducting means, means for connecting the control circuit of said second line-source responsive variable conducting means between said terminal means through the power circuit of said second latching variable conducting means, booster voltage source means, means for connecting said booster voltage source means to each of said terminal means through said second variable conducting means, means for connecting the control circuit of one of said first variable conducting means to each of the conductors of the subscriber line, means for connecting the control circuit of one of said second variable conducting means between the conductors of the subscriber line, and means for connecting the control circuit of one of said first variable conducting means to one subscriber line conductor and to one pole of the central office battery.

14. A voltage boosting arrangement as set forth in claim 9 in which said first line-source responsive variable conducting means and said second latching variable conducting means comprise thyristors and in which said second line-source responsive variable conducting and said first latching variable conducting means comprise NPN-transistors.

* * * * *

UNITED STATES PATENT OFFICE
CERTIFICATE OF CORRECTION

Patent No. 3,639,696 Dated February 1, 1972

Inventor(s) Charles W. Chambers, Jr.

It is certified that error appears in the above-identified patent and that said Letters Patent are hereby corrected as shown below:

Column 2, line 13, change "conduction" to --conducting--.

Column 3, line 65, change "is" to --in--.

Column 7, line 75, change "28b" to --28b'--.

Column 11, line 9, change "lnne" to --line--.

Claim 6, line 17, delete "first".

Claim 10, line 6, delete the hyphen.

Claim 13, line 27, change "to each of" to --between--.

Claim 13, line 32, change "between" to --to each of--.

Claim 14, line 6, erase the hyphen.

Signed and sealed this 13th day of June 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334